United States Patent [19]

Lutchemeier

[11] 3,998,471
[45] Dec. 21, 1976

[54] TRAILER HITCH ASSEMBLY

[75] Inventor: Fritz Lutchemeier, Houston, Tex.

[73] Assignee: Terrain King Corporation, Houston, Tex.

[22] Filed: Oct. 10, 1975

[21] Appl. No.: 621,587

[52] U.S. Cl. .................................. 280/492; 56/6
[51] Int. Cl.² ........................................ B60D 1/02
[58] Field of Search ................ 280/492, 204, 515; 56/6

[56] References Cited

UNITED STATES PATENTS 1,229,465  6/1917  Hudson ............................ 280/492
2,871,030  1/1959  Hollis .............................. 280/492

FOREIGN PATENTS OR APPLICATIONS 50,089  11/1939  France ............................. 280/204

Primary Examiner—Joseph F. Peters
Assistant Examiner—John A. Pekar

[57] ABSTRACT

A trailer hitch assembly for attaching the tongue of a trailer mower or the like to the drawbar of a tow vehicle, such as a tractor. The assembly includes a first clevis attached to the forward end of the tongue of the trailer for 360° relative rotation therewith. The attachment is by means of a first pin extending generally horizontally and generally parallel with the line of travel of the tractor and mower to thereby accommodate roll type relative movement therebetween. The apparatus also includes a swivel member in the form of a double clevis, with one clevis thereof arranged for rotational attachment to the first clevis by means of a second pin extending generally horizontally and transverse to said line of travel to thereby accommodate pitch type relative movement therebetween. The other clevis of said swivel member is arranged for rotational attachment to the drawworks by means of a generally vertically extending pin, to thereby accommodate yaw type relative movement therebetween. There is thus provided a trailer hitch which will not permit the tractor to be overturned in the event that the trailer is inadvertently overturned, thereby providing a safer mode of operation for the tractor and mower.

1 Claim, 5 Drawing Figures

TRAILER HITCH ASSEMBLY

BACKGROUND OF THE INVENTION

1. Field of the Invention

This invention relates to a trailer hitch assembly for attaching the tongue of a trailer vehicle to a tow vehicle having a drawbar attached thereto. More particularly, it relates to a trailer hitch assembly for attaching the tongue of a trailer type mower to the drawbar of a tractor, for example.

2. Description of the Prior Art

One type of trailer vehicle to which this invention is generally applicable are mowing devices of the type shown in U.S. Pat. Nos. 2,952,961 and 3,151,738. Mowing devices of the aforesaid type are conventionally attached to the drawworks of the tractor for pulling therebehind. Rotary cutting elements are usually connected to the power takeoff from the tractor. In operating such tractor and trailer mowers, the same must be driven over very rough and uneven terrain. Certain of the aforesaid trailer types may be comprised of three sections with one outboard wing section on each side, which wing sections may on occasion be raised to pass around obstacles or the like. In any event, situations arise where, through faulty operation of the mower trailer or because of the excessive inclination of the terrain over which the apparatus is being operated, the trailer mower has unexpectedly completely overturned. Heretofore, with conventional trailer hitches, the result of the trailer mower overturning often times caused the towing vehicle, i.e., the tractor, to overturn also, thereby endangering the life and safety of the operator of the tractor.

SUMMARY OF THE INVENTION

It is therefore an object of this invention to provide an improved trailer hitch assembly which will overcome the aforesaid problem and provide a safer operating piece of equipment which will present less danger to the vehicle operator.

Briefly stated, this invention is for a trailer hitch assembly for attaching the tongue of a trailer vehicle, such as a trailer mower, to the towbar of a tow vehicle. It includes a first swivel member attached to the forward end of the tongue and arranged for rotation relative thereto about a generally horizontal axis extending generally parallel with the line of travel of said vehicles. It also includes a second swivel member attached to the first swivel member for rotation relative thereto about a generally horizontal axis extending generally transverse to said line of travel. The second swivel member also has a portion arranged for attachment to the drawbar for relative rotation therewith around a generally vertical axis. The foregoing assembly thereby provides a connection which can accommodate roll, pitch and yaw type relative movement between the two vehicles.

Preferably, the first swivel member is attached to the tongue by a pin and arranged for 360° relative rotation thereabout. This first swivel may be in the form of a clevis which is attached to the second swivel member by means of another pin.

The second swivel member is preferably in the form of a double clevis, with one clevis thereof arranged for attachment to the first swivel member by means of a first pin and with the other clevis thereof arranged for attachment to the drawbar by means of another pin.

BRIEF DESCRIPTION OF THE DRAWING

FIG. 1 is a top plan view of a trailer mower of the type to which the present invention is applicable, showing the same attached to the drawbar of a tow vehicle such as a tractor or the like.

DESCRIPTION OF THE PREFERRED EMBODIMENT

Figure 1:
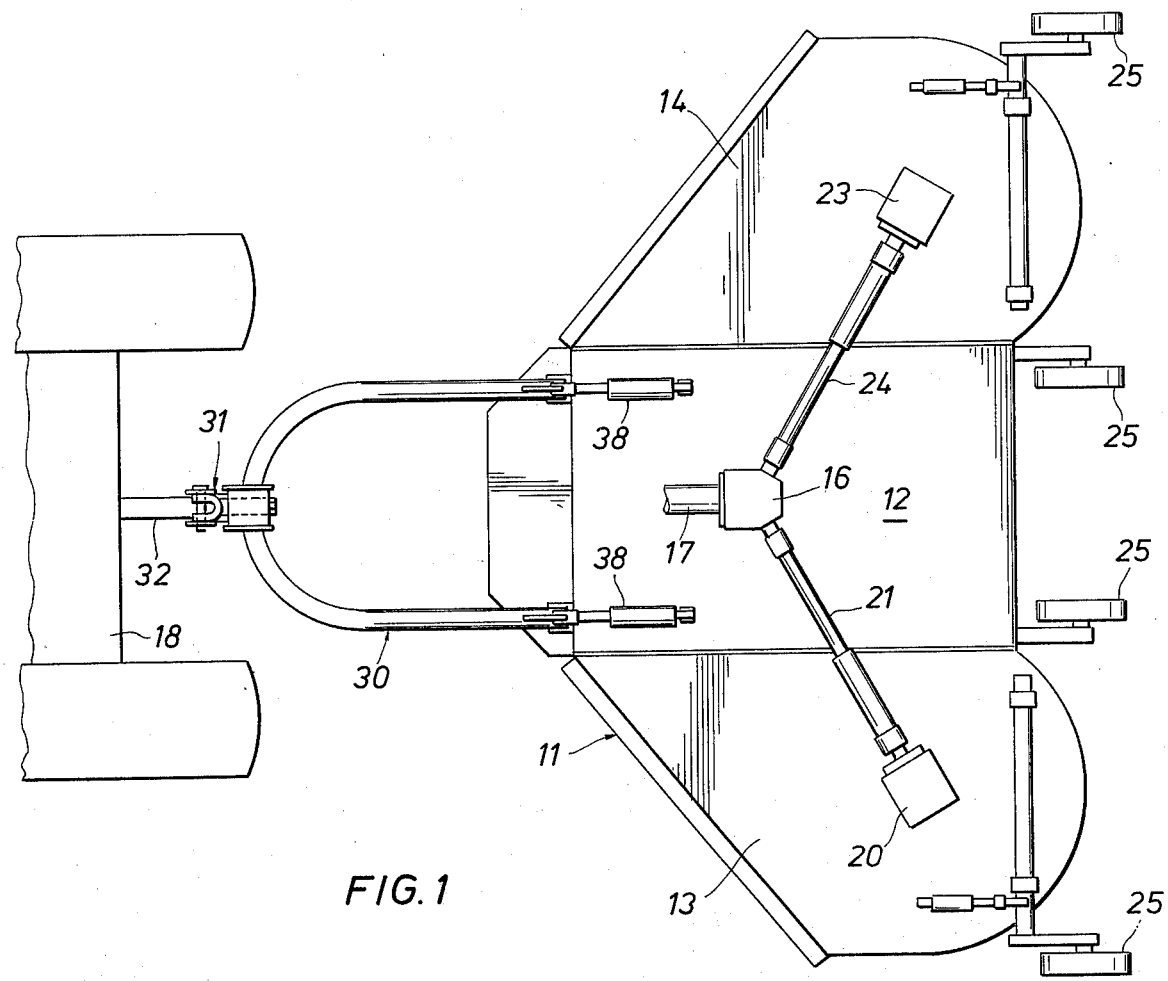
Figure 2:
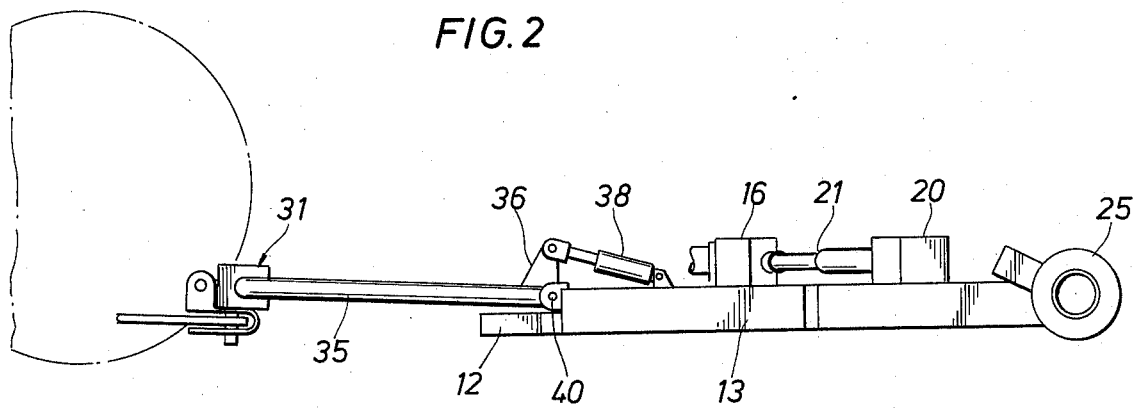
FIG. 2 is a side elevation view of the apparatus shown in FIG. 1.

Referring now to FIGS. 1 and 2 in particular, the numeral 11 generally designates the body of a trailer mower of the type to which the present invention is applicable. Body 11 is comprised of a central section 12, a left wing section 13, and a right wing section 14, with sections 13 and 14 being pivotally connected to section 12 for raising or lowering relative thereto, as is conventional with mowers of this type. Central section 12 has supported therebelow a cutting element (not shown) which is arranged for rotation in a generally horizontal plane by means of a shaft (not shown) attached to gear box 16, which in turn is driven by drive shaft 17 connected to the power takeoff of tractor 18, all in conventional manner.

Left wing section 13 has supported therebelow a similar rotary cutting member (not shown) operated through gear box 20, which is coupled by splined driveshaft 21 to gear box 16. Similarly, right wing section 14 has support therebelow a rotary cutting member (not shown) which is driven through gear box 23, splined shaft 24, which is also driven through gear box 16, again all in conventional manner.

The rear end of mower body 11 is supported by four rear wheels 25, all of which are mounted and arranged for raising and lowering relative to body 11 so as to adjust the height at which the rear end of mower body 11 is supported. The forward end of mower body 11 is supported by a tongue assembly generally designated by the numeral 30, which is connected by trailer hitch assembly 31 to drawbar 32, shown attached to tractor 18.

Figure 3:
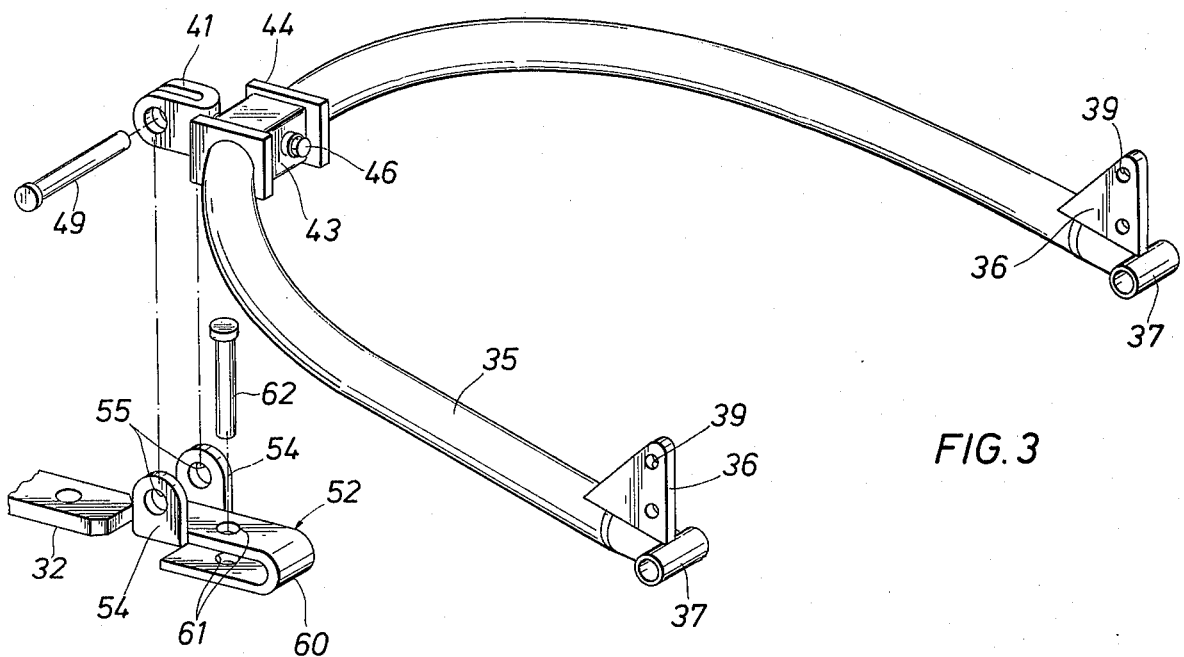
FIG. 3 is a perspective view of the trailer hitch assembly of this invention, which portions thereof partially disassembled.

Referring now to FIG. 3, in addition to FIGS. 1 and 2, additional details of the tongue assembly of the trailer mower will be described. Tongue assembly 30 is generally comprised of a generally U-shaped tubular tongue 35 having the aforesaid hitch assembly 31 attached to the forward end thereof, i.e. at the base of the U.

The rearward or trailing ends of tongue 35 each have attached therewith a generally horizontally extending pin receiving portion 37 and a generally upstanding lug 36 having one or more transversely extending holes 39 extending transversely therethrough. Portions 37 are attached to central section 12 by pins 40 as shown in FIG. 2. Each of the lugs 36 is connected to a leveling hydraulic cylinder assembly 38, the forward end of mower body 11 may be raised or lowered, all in conventional manner.

The present trailer hitch assembly invention has particularly utility in connecting tongue 35 to drawbar 32. The heretofore designated trailer hitch assembly 31 is comprised of a first swivel member in the form of swivel clevis 41 which is attached to the forward end of tongue 35 and arranged for relative rotation therewith about a generally horizontally extending axis, and which axis generally extends parallel with the line of travel of the vehicles. More particularly, swivel clevis 41 has attached to the rearward side thereof a roll pin 42 which passes through bushing 43 housed in bushing housing 44. Roll pin 42 extends through housing 44 and is secured by conventional washer 45 and nut 46. Roll pin 42 may be described as extending generally horizontally and parallel with the line of travel of the vehicle. Hence, swivel clevis 41 is permitted 360° rotation relative to tongue 35 about a generally horizontal axis through pin 42.

The birfurcated forward end of swivel clevis 41 is provided with appropriate pin holes for passage of tongue clevis pin 49 therethrough. Pin 49 is the means by which swivel clevis 41 is attachable to a second swivel member in the form of hitch clevis 52. For purposes of convenience, hitch clevis 52 may sometimes be referred to as a double clevis. This arises out of the fact that the forward end of hitch clevis 52 is provided wth a pair of upstanding lugs 54, each of which has generally horizontally extending pin holes 55 therethrough, which are arranged to accommodate and receive therethrough clevis pin 49 to thereby rotationally attach hitch clevis 52 to swivel clevis 41.

Hitch clevis 52 is also provided with another portion arranged for attachment to drawbar 32 for rotation relative thereto around a generally vertical axis. More particularly, hitch clevis 52 is provided with a generally U-shaped strap portion 60 having a vertically aligned pair of holes 61 provided therein for receipt therein of vertically extending hitch pin 62. Portion 60 of hitch clevis 62 is arranged for mountain above and below drawbar 32, as shown in FIG. 4, and for the passage of hitch pin 62 therethrough.

Figure 4:
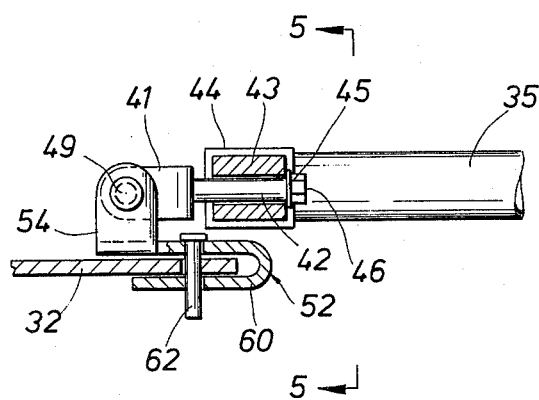
FIG. 4 is a partial central sectional view of the trailer hitch assembly of this invention.

In order to place trailer hitch assembly 31 in the connected mode shown in FIGS. 1, 2 and 4, swivel clevis 41 is, of course, more or less permanently connected to tongue 35 as shown in FIG. 3. Hitch clevis 52 is first connected to drawbar 32 by mounting thereover and passing hitch pin 62 downwardly therethrough and through drawbar 32.

Then, with tongue 35 already previously secured to mower body 11, also more or less in a permanent connection, tongue 35 is lowered such that the forward ends of swivel clevis 41 pass between lugs 54 of hitch clevis 52, and tongue clevis pin 49 is passed therethrough to complete the assembly as it is best shown in FIG. 4.

Figure 5:
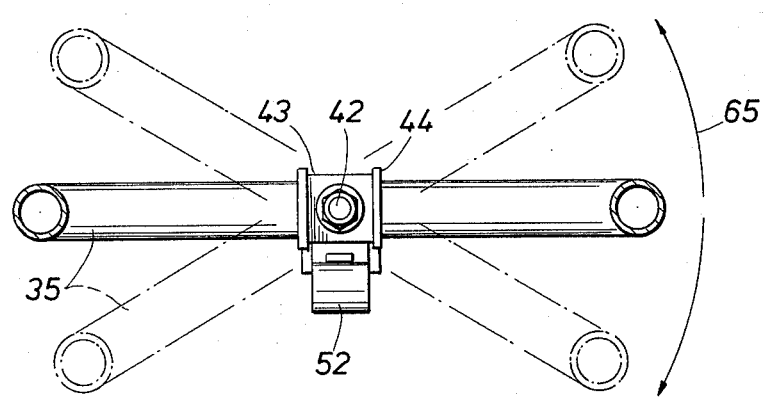
FIG. 5 is a cross-sectional view taken generally along line 5—5 of FIG. 4 and showing the relative rotational movement possible between portions of the assembly, as will be described hereinafter.

Referring now to FIG. 5, it will be apparent that the unique arrangement of the trailer hitch assembly of this invention permits tongue 35 to rotate 360° around roll pin 42 and relative to hitch clevis 52. This relative rotation may be in either direction as indicated by double arrow 65 in FIG. 5. Because of this relative rotation, any tendency for mower body 11 to turn relative to tractor 18 is accommodated by this connection. In the event that mower body 11 should become completely upset or overturned, this relative rotational connection heretofore described, prevents tractor 18 from being likewise turned over, which has been a problem with prior art trailer hitch aasemblies.

Stated otherwise, the connection of swivel clevis 41 to tongue 35 by means of roll pin 46 permits the trailer assembly to accommodate relative roll type movement therebetween. In addition, the interconnection of hitch clevis 52 by means of clevis pin 49 to swivel clevis 41 permits the hitch assembly to accommodate relative pitch type motion between mower body 11 and tractor 18. Further, the connection of hitch clevis 52 to drawbar 32 by means of hitch pin 62 permits the trailer hitch assembly to accommodate relative yaw type movement therebetween.

It will thus be apparent that this invention provides a relatively strong trailer hitch assembly which is easy to operate and maintain and, more importantly, one which provides a safer mower assembly during operation thereof, as described above.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A trailer hitch assembly for attaching the tongue of a trailer mower to the draw bar of a tractor, the combination comprising:

a swivel pin extending generally horizontally and generally parallel with the line of travel of said tractor and mower connected to said tongue for accommodating 360° roll type relative movement;

a first clevis connected to the forward end of said first pin, said first clevis having a pair of pin holes defining a transversely extending generally horizontal axis;

and a swivel member in the form of a double clevis including a generally U-shaped portion arranged for mounting over said draw bar and having pin holes defining a generally vertical axis for receipt of a pin for attaching said swivel member to said draw bar to thereby accommodate yaw type relative movement, and with the upper leg of said U-shaped member having rigidly attached to the forward end thereof a pair of upstanding lugs each of which has a pin hole therethrough defining a generally transversely extending horizontal axis for receipt of a pin for attaching said lugs to said first clevis to accommodate pitch type relative movement.

* * * * *